United States Patent
Renken

(10) Patent No.: US 8,163,812 B2
(45) Date of Patent: Apr. 24, 2012

(54) PROCESS FOR MAKING THERMALLY RESISTANT MINERAL-FILLED POLYACETAL

(75) Inventor: Andreas Renken, Geneva (CH)

(73) Assignee: E.I. du Pont de Nemours and Company, Wilmington, DE (US)

( * ) Notice: Subject to any disclaimer, the term of this patent is extended or adjusted under 35 U.S.C. 154(b) by 116 days.

(21) Appl. No.: 12/628,462

(22) Filed: Dec. 1, 2009

(65) Prior Publication Data

US 2010/0142676 A1     Jun. 10, 2010

Related U.S. Application Data

(60) Provisional application No. 61/119,845, filed on Dec. 4, 2008.

(51) Int. Cl.
*C08J 3/28*     (2006.01)

(52) U.S. Cl. .......... 522/71; 522/166; 524/315; 524/322; 524/423; 524/432

(58) Field of Classification Search .................. 524/315, 524/322, 423, 432; 522/71, 166
See application file for complete search history.

(56) References Cited

U.S. PATENT DOCUMENTS

| | | | |
|---|---|---|---|
| 4,130,604 A | | 12/1978 | Edelman |
| 4,766,168 A | | 8/1988 | West |
| 5,679,743 A | * | 10/1997 | Hirai et al. ............... 525/88 |
| 5,886,066 A | * | 3/1999 | Forschirm ............... 523/200 |
| 6,013,723 A | * | 1/2000 | Akao ....................... 524/577 |
| 6,284,828 B1 | * | 9/2001 | Takayama ............... 524/413 |
| 2003/0059567 A1 | * | 3/2003 | Cediel et al. ............. 428/54 |
| 2003/0171470 A1 | * | 9/2003 | Kurz et al. ............... 524/284 |
| 2006/0025507 A1 | * | 2/2006 | Moore et al. ............ 524/275 |
| 2006/0111473 A1 | | 5/2006 | Yuan |
| 2006/0142455 A1 | * | 6/2006 | Agarwal et al. .......... 524/423 |
| 2008/0004391 A1 | * | 1/2008 | Chan et al. ............... 524/445 |
| 2010/0240818 A1 | * | 9/2010 | Walton et al. ............. 524/505 |

FOREIGN PATENT DOCUMENTS

WO     02/14429     2/2002

\* cited by examiner

*Primary Examiner* — Peter Szekely

(74) *Attorney, Agent, or Firm* — Loretta Smith; Otha Weaver

(57) ABSTRACT

The present invention relates to a method of making polyacetal compositions and molded articles of these, which comprise at least one mineral filler that has not been previously coated before being mixed into the compositions.

8 Claims, No Drawings

PROCESS FOR MAKING THERMALLY RESISTANT MINERAL-FILLED POLYACETAL

FIELD OF INVENTION

The present invention relates to a method of making polyacetal compositions and molded articles from these, which comprise at least one mineral filler that has not been previously coated before being mixed into the composition.

BACKGROUND

Polyacetal (also called polyoxymethylene, POM) resins exhibit excellent mechanical and physical properties, such as tensile strength, stiffness, as well as fatigue resistance, self-lubrication, chemical resistance, moldability and the like. These resins are extensively used as an engineering plastic material in various applications that include automotive and domestic appliances, in construction, in machinery, and in the tool, electronics and consumer goods industries. In addition to their excellent mechanical and physical properties, polyacetal resins are known to exhibit good self-lubricating properties and wear resistance and have been used for applications having moving parts that contact other parts.

Polyacetal resins have been variously modified to provide add-on properties. Examples of resin modification include the addition of fillers to provide an almost unlimited range of compositions to fit a wide range of engineering applications. Nonetheless, additives or fillers in polyacetal compositions often have adverse effects on the composition's processability and in particular, on moldability, extrudability, mechanical properties and thermal stability.

Degradation and low thermal stability are common drawbacks of polyacetal resins, which are inherently unstable in the presence of air at high temperature and decompose to generate formaldehyde during processing or shaping of articles. This in turn is chemically active and readily oxidizable to formic acid, which can decompose polymeric chains and adversely affects the heat resistance of the polyacetal resin.

U.S. Pat. App. Pub. No. US 2006/0111473 discloses a high-density polyacetal composition that comprises at least one surface-coated mineral and which are said to have improved thermal stability. The process of making such high-density polyacetal resins involves at least two steps: first, surface-coating the mineral with an appropriate coating agent; and, then melt-mixing the coated mineral with the resin. The complexity of the current manufacturing processes renders the production of these polyacetal resins time consuming and hampers a high productivity of the process.

There remains a need for a simpler and more efficient method of incorporating mineral fillers into a polyacetal composition, which avoids the decomposition of the polyacetal composition, and which results in polyacetal compositions that exhibit both maintained or improved thermal resistance and maintained or improved mechanical properties.

SUMMARY

Described herein are methods of making a polyacetal composition by incorporating at least one mineral filler into a polyacetal composition and comprise mixing
  i) from at or about 20 to at or about 84.5 weight percent of a polyacetal resin, based on the total weight of the polyacetal composition;
  ii) from at or about 15 to at or about 80 weight percent of at least one mineral filler, based on the total weight of the polyacetal composition; and
  iii) from at or about 0.5 to at or about 6 weight percent of at least one component selected from the group consisting of fatty acid esters, fatty acid amides, and mixtures of these, based on the weight of the at least one mineral filler,
wherein the at least one mineral filler has not been previously coated.

Also described herein are methods of making a shaped polyacetal composition comprising:
a) mixing
  i) from at or about 20 to at or about 84.5 weight percent of a polyacetal resin, based on the total weight of the polyacetal composition;
  ii) from at or about 15 to at or about 80 weight percent of at least one mineral filler, based on the total weight of the polyacetal composition;
  iii) from at or about 0.5 to at or about 6 weight percent of acid esters and/or fatty acid amides, based on the weight of the at least one mineral filler,
  to obtain a polyacetal composition; and
b) shaping the polyacetal composition of a),
wherein the at least one mineral filler has not been previously coated.

Also described herein are parts for a conveyor belt made from a polyacetal composition, the parts comprising:
  i) from at or about 20 to at or about 84.5 weight percent of a polyacetal resin, based on the total weight of the polyacetal composition,
  ii) from at or about 15 to at or about 80 weight percent of at least one mineral filler selected from barium sulfate, lanthanide oxide, zinc oxide and mixtures of these, based on the total weight of the polyacetal composition; and
  iii) from at or about 0.5 to at or about 6 weight percent of at least one component selected from fatty acid esters, fatty acid amides and mixtures of these, based on the weight of the at least one mineral filler,
wherein the at least one mineral filler has not been previously coated.

Also described herein are methods for detecting in an ingestible product conveyed by a conveyor system the presence of conveyor system material comprising:
a) making at least one conveyor system part comprising a polyacetal composition made by a method comprising: mixing
  i) from at or about 20 to at or about 84.5 weight percent of a polyacetal resin, based on the total weight of the polyacetal composition;
  ii) from at or about 15 to at or about 80 weight percent of at least one X-ray opaque mineral filler, based on the total weight of the polyacetal composition; and
  iii) from at or about 0.5 to at or about 6 weight percent of at least one component selected from the group consisting of fatty acid esters, fatty acid amides, and mixtures of these, the weight percent based on the weight of the at least one mineral filler,
  wherein the at least one X-ray opaque, mineral filler has not been previously coated;
b) transporting the ingestible product by a conveyor system comprising the at least one conveyor system part made by step a);
c) irradiating the ingestible product with X-Rays;
d) detecting the presence of X-ray opaque mineral filler.

DETAILED DESCRIPTION OF THE INVENTION

Definitions

The following definitions should be used to construe the terms recited in the claims and used in the specification.

As used herein, the phrases "about" and "at or about" mean that the amount or value in question may be the value designated or some other value about the same. The phrase is intended to convey that similar values promote equivalent results or effects according to the invention.

As used herein, "single mixing event" or "single mixing step" refers to a mixing or adding of components i), ii) and iii) [as enumerated in the Summary above] either all at once together or sequentially in a stepwise fashion such that one or two components may be added and then followed by a second or third component within the same melt-mixing apparatus to yield a composition in which components i), ii) and iii) have been simultaneously mixed.

As used herein, "ingest" refers to taking into the body by the mouth for digestion or absorption. "Ingestible" refers to any thing that may be taken into the body by the mouth for digestion or absorption and is a quality of, among other things, comestibles, food, beverages, nutriceuticals and pharmaceuticals.

As used herein, "conveyor system" refers to a common piece of mechanical handling equipment that moves materials from one location to another. Conveyors are especially useful in applications involving the transportation of heavy or bulky materials and allow quick and efficient transportation for a wide variety of materials. Many types of conveyor systems are available, and are used according to the various needs of different industries. Conveyor systems include but are not limited to: belt conveyors, belt driven line rollers, multiflexing chain conveyors and lineshaft roller conveyors.

As used herein, "previously coated" as characterization of a mineral filler refers to the situation when the mineral filler is recognizable as having a coating comprising at least one component selected from the group consisting of fatty acid esters, fatty acid amides, and mixtures of these, at the time at which the coated mineral filler is mixed in a polyacetal composition.

Coating can be carried out by methods known to a person of ordinary skill in the art, for example by wetting with a solution and drying, or by dry mixing.

A mineral filler is recognizable (at the time of mixing into a polyacetal composition) as having not been previously coated if the mineral filler has no, or less than 0.5 weight percent of a coating of a fatty acid ester, or fatty acid amide or mixtures of these, based on the weight of the mineral filler, at the time at which the mineral filler is used in a polyacetal composition.

The polyacetal composition made by the methods described herein may be suitable to make, among other things, belts, chains, rollers and O-rings in various types of conveyor systems.

Methods of Making Polyacetal Compositions

Described herein are methods of making a polyacetal composition by incorporating at least one mineral filler into a polyacetal composition and comprise mixing from at or about 20 to at or about 84.5 weight percent of a polyacetal resin, based on the total weight of the polyacetal composition; from at or about 15 to at or about 80 weight percent of at least one mineral filler, based on the total weight of the polyacetal composition; and from at or about 0.5 to at or about 6 weight percent of at least one component selected from the group consisting of fatty acid esters, fatty acid amides, and mixtures of these, based on the weight of the at least one mineral filler, and wherein the at least one mineral filler has not been previously coated.

Comparing thermally resistant polyacetal compositions comprising coated minerals and made by conventional methods, the polyacetal compositions made by the methods described herein can show a comparable or higher thermal stability while often maintaining good mechanical properties and can be manufactured at lower costs.

The methods described herein involve mixing i) polyacetal resin, ii) at least one mineral filler and iii) one or more fatty acid esters, fatty acid amides and mixtures of these in a single mixing event that does not involve an additional step of pre-coating the at least one mineral filler. The compositions are melt-mixed blends, wherein the polyacetal resin i), the at least one mineral filler ii), and the one or more fatty acid esters, fatty acid amides and/or mixtures thereof iii) are well-dispersed within each other and the ingredients ii) and iii) are well-dispersed in and bound by the polymer resin, such that the blend forms a unified whole.

Any melt-mixing method may be used to combine and mix the polymeric components and non-polymeric ingredients of the present invention. For example, components i), ii) and iii) [as listed in the Summary] may be added to a melt mixer, such as, a single or twin-screw extruder; a blender, a single or twin-screw kneader, or a Banbury mixer, either all at once through a single step addition, or in a stepwise fashion, wherein i) is added and an amount of ii) and an amount of iii) are first added and melt-mixed, the remaining of ii) and iii) being subsequently added and further melt-mixed.

Components of the Polyacetal Compositions i) Polyacetal Resin

The polyacetal resin (also called polyoxymethylene or POM) used in the methods described herein may be one or more homopolymers, copolymers, or a mixture of these. Acetal homopolymers include homopolymers of formaldehyde or of cyclic oligomers (e.g. trioxane and tetraoxane) of formaldehyde, the terminal groups of which may be end-capped by a chemical reaction to form ester or ether groups, preferably acetate or methoxy groups, respectively. Preferred acetal homopolymers include those whose terminal hydroxyl groups have been end-capped. End-capping is generally done to prevent the polyacetal from "unzipping", particularly at elevated temperatures.

Acetal copolymers include copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification, or a mixture of such homopolymers and copolymers. Acetal copolymers contain at least one comonomer. Comonomers commonly used in preparing acetal copolymers include alkylene oxides of 2-12 carbon atoms and their cyclic addition products with formaldehyde. The quantity of comonomer is generally not more than about 20 weight percent, preferably not more than about 15 weight percent, and most preferably about 2 weight percent, the weight percent based on the total weight of the polyacetal resin. Most preferred is ethylene oxide.

The polyacetal resin used in the methods described herein may be branched or linear and generally has a number of average molecular weight in the range of about 10,000 to 100,000 and preferably about 20,000 to 90,000. These polyacetal molecular weights are generally preferred in order to provide an optimum balance of good mixing of the various ingredients to be melt blended into the composition with the most desired combination of physical properties in the molded articles made from the such compositions; however, polyacetals having higher or lower molecular weight averages may be used, depending on the physical and processing properties desired. The molecular weight of the polyacetal may conveniently be measured by gel permeation chromatography in m-cresol at 160° C. using a DuPont PSM bimodal column kit with nominal pore size of 60 and 1,000 angstroms. The molecular weight can also be measured by determining the melt flow using ASTM D1238 or ISO 1133.

The melt flow of the polyacetal resin will preferably be in the range of 2 to 70 g/min, more preferably from 2 to 50 g/min, or still more preferably from 2 to 40 g/min. for injection molding purposes. Suitable polyacetal resins for use in the methods described herein are commercially available from E.I. du Pont de Nemours and Company, Wilmington, Del. under the registered mark DELRIN®.

The polyacetal resin is present from at or about 20 weight percent to at or about 84.5 weight percent, preferably from at or about 30 weight percent to at or about 80 weight percent, and more preferably in about from at or about 35 weight percent to at or about 75 weight percent, based on the total weight of the polyacetal composition.

ii) Mineral Filler

The methods described herein comprise mixing at the same time, i.e. without any pre-coating step, the at least one mineral filler with the other ingredients of the polyacetal composition. Polyacetal compositions are known to degrade in the presence of mineral fillers so as to lose their melt-processability or become unsuitable for manufacturing articles that are sufficiently thermally resistant. For this reason, the method of the present invention is particularly suited for incorporating mineral fillers that cause polyacetal resins to decompose under conventional processing and compounding conditions while avoiding costly pre-treatment.

Examples of mineral fillers include fillers based on alkali metal cations, alkaline earth metal cations, transition metal cations, lanthanide cations, actinides cations, alumina, silica and kaolin clay. Preferably, the at least one mineral filler is selected from fillers based on magnesium cations, such as magnesium hydroxide; fillers based on calcium cations, such as calcium carbonate; fillers based on zinc cations, such as for example zinc oxide; fillers based on titanium cations, such as titanium dioxide and titanates; fillers based on lanthanide cations, such as lanthanide oxides; fillers based on barium cations, such as barium sulfate; alumina, silica and kaolin clay.

A polyacetal composition made by the methods described herein may be particularly useful when the mineral filler used in the composition is X-ray-opaque, such as mineral fillers based on heavy metals. Such mineral fillers facilitate the detection of the composition by X-ray radiation. Examples of heavy metals include lanthanides, zinc and barium. Preferably, the at least one mineral filler is a lanthanide oxide, a barium salt, a zinc salt or mixtures of these. Examples of barium salt include without limitation barium sulfate, barium hexaboride, barium chromite, barium fluogallate, barium triorthophosphate, barium metasilicate, barium titanate and barium zirconate. More preferably, the at least one mineral filler is barium sulfate, zinc oxide and/or mixtures of these, and still more preferably barium sulfate.

The at least one mineral filler is added to the polyacetal resin in an amount form at or about 15 to at or about 80 weight percent, preferably from at or about 15 weight percent to at or about 60 weight percent, and more preferably in about from at or about 20 weight percent to at or about 50 weight percent, based on the total weight of the polyacetal composition.

iii) Fatty Acid Ester, Fatty Acid Amide and Mixtures of These

The polyacetal compositions made by the methods described herein comprise at least one fatty acid ester, fatty acid amides or mixtures of these. Fatty acids generally comprise a chain of alkyl groups containing from about 2 to about 80 carbon atoms and having a terminal methyl group and a terminal carboxyl group. Fatty acids may be saturated, unsaturated or multi-unsaturated. Examples of fatty acids suitable for use include, but are not limited to, caproic acid (C6); caprylic acid (C8); pelargonic acid (C9); capric acid (C10); lauric acid (C12); myristic acid (C14); palmitic acid (C16); margaric acid (C17); stearic acid (C18); oleic acid (C18); arachidic acid (C20); behenic acid (C22); lignoceric acid (C24); cerotic acid (C26); montanic acid (C28); and melissic acid (C30). Unsaturated fatty acid esters and fatty acid amides may also be used. Unsaturated fatty acid esters and fatty acid amides that have been fully or partially epoxidized may be used. Preferably, the at least one fatty acid ester, fatty acid amide and mixture of these used in these methods comprise a chain of alkyl groups containing from about 10 to about 40 carbon atoms and more preferably from about 10 to 30 carbons atoms and a terminal ester group or amide group.

Fatty acid amides include any compound that has either a single amido group, i.e., a monoamide, or that has two amide groups, i.e, a bisamide, which are derived from a fatty acid with an amine which can be a monoamine, a diamine or a polyamine. The monoamides may include capric acid amide, lauric acid amide, myristic acid amide, palmitic acid amide, stearic acid amide, arachic acid amide, behenic acid amide or montanic acid amide, stearyl stearic acid amide or stearyl oleic acid amide. The bisamides may include the bisamides of the fatty acid with a $C_{1-6 alkylenediamine}$ such as ethylenediamine-distearic acid amide (ethylenebisstearylamide), hexamethylenediamine-distearic acid amide, ethylenediamine-dioleic acid amide and ethylenediamine-dierucic acid amide.

Fatty acid esters are derived from an alcohol which can be a monohydric alcohol, a polyhydric alcohol or a polymer of an alkylene glycol and a fatty acid. Preferably, at least one fatty acid ester is used in the methods described herein. Preferably, the at least one fatty acid esters used in these methods are derived from a polyhydric alcohol, more preferably from ethylene glycol, propylene glycol, glycerol, erythritol, mannitol, sorbitol or xylitol, and still more preferably from glycerol. Preferably, the at least one fatty acid ester is derived from monolaurate, monopalmitate, monostearate, monobehenate, monomontanate, monooleate, monolinolate, dilaurate, dipalmitate, distearate, dibehenate, dimontanate, dioleate and/or dilinolate and a polyhydric alcohol and more preferably the polyhydric alcohol is glycerol. More preferably, the one or more fatty acid esters are monostearate of glycerol, monooleate of glycerol and mixtures thereof. Still more preferably, the one or more fatty acid esters is monostearate of glycerol (also known as glyceryl monostearate).

The one or more fatty acid esters, fatty acid amides and mixtures of these are added to the polyacetal resin in an amount form at or about 0.5 to at or about 6 weight percent, preferably from at or about 1 weight percent to at or about 6 weight percent, and more preferably in about from at or about 1 weight percent to at or about 5 weight percent, based on the weight of the at least one mineral filler.

Other Components

The polyacetal composition manufactured according to the method of the invention may optionally comprise one or more components such as thermal stabilizers, fillers, modifiers, oxidative stabilizers, lubricants, impact modifiers, ultra-violet [UV] light stabilizers and reinforcing agents. Stabilizers, reinforcing agents, modifiers and other ingredients described below may be present in the composition in amounts and in forms well known in the art, including in the form of so-called nano-materials where at least one of the dimensions of the particles is in the range of 1 to 1000 nano-meters.

Thermal Stabilizers

Thermal stabilizing agents serve to stabilize the compositions made by the methods described herein at elevated temperatures, such as molding temperatures, extruding temperatures and the like. Preferably, the one or more thermal stabilizing agents are polymers having formaldehyde reactive nitrogen groups as pendant groups on the polymer chain, hydroxy containing polymers or oligomers, polyamides, polymers having epoxy groups as pendant groups, and mixtures of these.

Polymers Having Formaldehyde Reactive Nitrogen Groups as Pendant Groups on the Polymer Chain Formaldehyde reactive nitrogen groups are pendant groups on the polymer chain, which contain a nitrogen bonded to one or, preferably, two hydrogen atoms. Polymers having such pendant groups may be homopolymers or copolymers and preferably have a weight average molecular weight of greater than 5,000, more preferably greater than 10,000. The quantity of the formaldehyde reactive nitrogen groups in the polymer having formaldehyde reactive nitrogen groups as pendant groups on the polymer chain is preferably such that the atoms in the backbone to which the formaldehyde reactive groups are attached, either directly or indirectly, are separated from each other (i.e., connected to each other) by not more than twenty chain atoms. Preferably, the polymer having these pendant groups contain at least one formaldehyde reactive nitrogen group per each twenty carbon atoms in the backbone of the polymer. More preferably, the ratio of formaldehyde reactive nitrogen groups to carbon atoms in the backbone will be 1:2-1:10 and yet more preferably 1:2-1:5.

The formaldehyde reactive nitrogen groups may be incorporated into the polymer by using an appropriate nitrogen containing monomer, such as, for example, acrylamide and methacrylamide so as form polyacrylamide and polymethacrylamide. The polymer having these pendant groups is preferably prepared by a free radical polymerization of acrylamide or methacrylamide monomers and consequently consists of at least 75 mole percent of units derived from acrylamide or methacylamide. The polymer consists preferably of at least 90 mole percent; more preferably of at least 95 mole percent; yet more preferably, of at least 99 mole percent, of the above units.

The polymer having formaldehyde reactive nitrogen groups as pendant groups on the polymer chain may be a copolymer in that it is polymerized from more than one monomer. The comonomer may or may not contain formaldehyde reactive nitrogen groups. Examples of other monomers that may be thus incorporated include styrene, ethylene, alkyl acrylates, alkyl methacrylates, N-vinylpyrrolidone, and acrylonitrile. The comonomer preferably should be added such that it does not unduly minimize the number of moles of formaldehyde reactive groups per gram of polymeric stabilizer. Further, it should not unduly minimize the number of formaldehyde reactive sites per gram of polymeric stabilizer. Specific preferred stabilizers that are copolymeric include copolymers of hydroxypropyl methacrylate with acrylamide, methacrylamide, or dimethylaminoethyl methacrylate.

Hydroxy Containing Polymers or Oligomers

Hydroxy containing polymers and oligomers are described in U.S. Pat. No. 4,766,168, which is hereby incorporated by reference. The hydroxy groups of the hydroxy-containing polymers and oligomers used may be directly bonded to the polymer or oligomer backbone, or may be present on pendant groups, or both. Preferably the hydroxy containing polymers and oligomers will contain on average at least one hydroxy group per each twenty carbon atoms in the polymer or oligomer backbone and not more than one hydroxy group per carbon atom in the backbone. Examples of suitable hydroxy containing polymers and oligomers include ethylene vinyl alcohol copolymer (EVOH); poly(vinyl alcohol); vinyl alcohol/methylmethacrylate copolymers; and hydroxyesters of poly(meth)acrylates.

Polyamides

Polyamides as thermal stabilizing agents are preferably aliphatic polyamides such as for example and can include polyamide 6 and polyamide 6,6 and copolyamides such as polyamide 6/6,12 and polyamide 6/6,6 and terpolyamides such as polyamide 6,6/6,10/6. The aliphatic polyamide preferably has a melting point of less than about 210° C. The polyamide may be predispersed in a carrier resin such an ethylene/methacrylic acid copolymer, a partially neutralized ethylene/methacrylic acid copolymer (e.g. ionomer), or a thermoplastic polyurethane.

Polymers Having Epoxy Groups as Pendant Groups

Polymers having epoxy groups as pendant groups as thermal stabilizing agents are preferably ethylene epoxide copolymers. Ethylene epoxide copolymers are ethylene copolymers that are functionalized with epoxy groups. As used herein, "functionalized", means that the groups are grafted and/or copolymerized with organic functionalities. Examples of epoxides used to functionalize copolymers are unsaturated epoxides comprising from four to eleven carbon atoms, such as glycidyl (meth)acrylate (GMA), allyl glycidyl ether, vinyl glycidyl ether and glycidyl itaconate, wherein "(meth)acrylate" refers to alkyl acrylate and/or alkyl methacrylate.

Preferably, epoxides used to functionalize copolymers are glycidyl (meth)acrylates. The ethylene/glycidyl (meth)acrylate copolymer may further contain copolymerized units of an alkyl (meth)acrylate having from one to six carbon atoms and an α-olefin having 1-8 carbon atoms. Representative alkyl (meth)acrylates include methyl (meth)acrylate, ethyl (meth)acrylate, propyl (meth)acrylate, butyl (meth)acrylate, isobutyl (meth)acrylate, hexyl (meth)acrylate, or combinations of two or more of these. Of note are ethyl acrylate and butyl acrylate so as to form ethylene butyl acrylate glycidyl methacrylate terpolymer (EBAGMA).

Preferably the one or more thermal stabilizing agents are selected from polyacrylamides, ethylene vinyl alcohol copolymers (EVOH) and mixtures of these. When included in the polyacetal compositions made by the methods described herein, the one or more thermal stabilizing agents are preferably present in an amount between at or about 0.005 weight percent to at or about 4.00 weight percent, more preferably between at or about 0.05 weight percent to at or about 1.50 weight percent and more preferably from at or about 0.20 weight percent to at or about 1.00 weight percent, based on the total weight of the polyacetal composition.

Oxidative Stabilizers

Polyacetal compositions made by the methods described herein may optionally comprise one or more oxidative stabilizers (antioxidants), which include hindered phenol stabilizers. When included in the polyacetal compositions made by the methods described herein, the one or more oxidative stabilizers are preferably present in an amount between at or about 0.05 weight percent to at or about 1 weight percent, based on the total weight of the polyacetal composition.

Lubricants

Examples of lubricants suitable for use in the polyacetal compositions made by the methods described herein include silicone lubricants such as dimethylpolysiloxanes and their derivatives, alkyl acid amides, bis-fatty acid amides such as N,N'-ethylenebisstearamide, non-ionic surfactant lubricants, hydrocarbon waxes, chlorohydrocarbons, fluorocarbons, oxy-fatty acids, esters such as lower alcohol esters of fatty acids, and polyvalent alcohols such as polyglycols and polyglycerols. When included in the polyacetal compositions made by the methods described herein, the one or more lubricants are preferably present in an amount between at or about 0.1 weight percent to at or about 5 weight percen, preferably between at or about 0.5 weight percent to at or about 2 weight percent, based on the total weight of the polyacetal composition.

Impact Modifiers

Examples of impact modifiers suitable for use in the polyacetal compositions made by the methods described herein include thermoplastic polyurethanes, polyester polyether elastomers, and core-shell acrylate polymers. When so included in these polyacetal compositions, the one or more impact modifiers are preferably present in an amount between at or about 5 weight percent to at or about 40 weight percent, preferably between at or about 10 weight percent to at or about 30 weight percent, based on the total weight of the polyacetal composition.

Ultra-Violet (UV) Light Stabilizers

Examples of UV light stabilizers suitable for use in the polyacetal compositions made by the methods described herein include hindered amine light stabilizers (HALS), carbon black, benzotriazoles, benzophenones, aromatic benzoates, cyano acrylates, and oxalic acid anilides. When included in the polyacetal compositions made by the methods described herein, the one or more UV light stabilizers are preferably present in an amount between at or about 0.05 weight percent to at or about 2 weight percent, preferably between at or about 0.1 weight percent to at or about 1.5 weight percent, based on the total weight of the polyacetal composition.

Reinforcing Agents

The polyacetal compositions made by the methods described herein may optionally comprise one or more reinforcing agents such as for examples suitable glass fibers, glass flakes, carbon fibers, talc, wollastonite, calcinated clay, aramid, and mica. When so included in these polyacetal compositions, the reinforcing agents are present in an amount from at or about 1 to at or about 60 weight percent, preferably from at or about 1 to at or about 40 weight percent, or more preferably from at or about 1 to at or about 35 weight percent, based on the total weight of the resin composition.

Besides optionally including the other components described above, these polyacetal compositions may further include other optional ingredients, such as, flow enhancing additives, antistatic agents, coloring agents, flame retardants, nucleating agents, plasticizers, crystallization promoting agents and other processing aids known in the polymer compounding art.

Methods of Shaping a Polyacetal Composition

The methods described herein also include making a polyacetal composition that is shaped. These methods use the same step of mixing the above described components:

i) from at or about 20 to at or about 84.5 weight percent of a polyacetal resin, based on the total weight of the polyacetal composition;

ii) ii) from at or about 15 to at or about 80 weight percent of at least one mineral filler, based on the total weight of the polyacetal composition;

iii) iii) from at or about 0.5 to at or about 6 weight percent of acid esters and/or fatty acid amides, based on the weight of the at least mineral filler, to obtain a polyacetal composition, and then shaping it. The shaped polyacetal acetal composition may further comprise one or more of the optional components described above.

As used herein, "shaping" refers to any technique, such as extrusion, injection molding, compression molding, blow molding, thermoforming, rotational molding and melt casting, which results in the shaping of the polyacetal compositions made by the methods described herein into articles. Injection molding is preferred in these methods.

Shaped Article

The polyacetal composition may be shaped into any shaped article including, but not limited to, structural and functional parts in electrical/electronic instruments, automobile parts, precision machine parts, especially those machine parts that move in contact with other parts, such as bearings, gears, cams, rollers, sliding plates, pulleys, levers, guides and conveyor system components such as wear strips, guard rails and conveyor belt parts.

Described herein is a part for a conveyor belt made from the polyacetal compositions described herein. Preferably, the part for a conveyor belt is made from a polyacetal composition wherein the at least one mineral filler is X-ray opaque and selected from barium sulfate, lanthanide oxide, zinc oxide and mixtures of these. These conveyor belt parts may be X-ray-detectable.

In addition, any other shaped article made from a polyacetal composition made by the methods described herein may be X-ray-detectable. Such x-ray-detectable parts include toys and medical devices, especially surgical implants and devices. A major advantage of using an X-Ray-detectable composition in such articles is their ability to be detected in the body, after implantation or ingestion, to confirm correct placement and facilitate removal.

Methods of Detecting Conveyor Belt Parts in Conveyed Material to be Ingested

Other shaped articles made from a polyacetal composition made by the methods described herein include parts of a conveyor system used to transport ingestible products. Using these articles facilitates a method of detecting conveyor system parts in a transported product, which is particularly suited for use in the food, nutriceutical and pharmaceutical industries. Specifically, using such shaped articles offers the advantage of X-ray detection of conveyor system material in conveyed material that is to be ingested, which includes all manner of comestibles, beverages, nutriceuticals pharmaceuticals, etc. Such conveyor system material may contaminate the matter being conveyed because of broken conveyor belts and other conveyor system parts, fragments of which may be liberated into the conveyed ingestible matter. Thus, using the polyacetal compositions made by the methods described herein to make conveyor belt systems facilitates the detection of conveyor belt parts in X-ray irradiated food.

Also described herein are methods for detecting in an ingestible product conveyed by a conveyor system the presence of conveyor system material comprising:

a) making at least one conveyor system part comprising a polyacetal composition made by a method comprising:
mixing i) from at or about 20 to at or about 84.5 weight percent of a polyacetal resin, based on the total weight of the polyacetal composition;

ii) from at or about 15 to at or about 80 weight percent of at least one X-ray opaque mineral filler, based on the total weight of the polyacetal composition; and iii) from at or about 0.5 to at or about 6 weight percent of at least one component selected from the group consisting of fatty acid esters, fatty acid amides, and mixtures of these, the weight percent based on the weight of the at least one mineral filler,
wherein the at least one X-ray opaque, mineral filler has not been previously coated;
b) transporting the ingestible product by a conveyor system comprising the at least one conveyor system part made by step a);
c) irradiating the ingestible product with X-Rays;
d) detecting the presence of X-ray opaque mineral filler.

EXAMPLES

These examples further illustrate but do not limit the invention.

Materials

The following materials were used for preparing the polyacetal compositions manufactured according to the present invention and composition manufactured according to a comparative method.

Polyacetal resin copolymer: polyacetal copolymer supplied by BASF, under the trademark Ultraform® S2320.

Polyacetal resin homopolymer: thermal stabilized (ethylene vinyl alcohol copolymer, 0.15 wt-% and polyacrylamide, 0.625 wt-%) polyacetal homopolymer having a number average molecular weight of about 47,000 and comprising 0.1 wt-% of an antioxidant (ethylene bis(oxyethylene) bis(3-tert-butyl-4-hydroxy-5-methyl hydrociannamate)) and 0.875 wt-% of polyethylene glycol.

Thermal stabilizer: polyacrylamide supplied by Nisson Gossi as MAP 1070.

Mineral filler: barium sulfate having an average part size of 1.7 microns supplied by Solvay S.A. as Blanc Fixe N.

Fatty acid ester: glyceryl monostearate supplied by Stepan Company, under the trademark Drewmulse® 200 k.

Polyacetal compositions according to the present invention and comparative ones are given in Table 1.

Compounding Method:

Polyacetal compositions were prepared by compounding in a 40 mm Berstorf twin screw extruder. The polyacetal resin pellets were added to the rear (barrel 1) of the extruder, and the minerals and the fatty acid esters were side fed into Barrel 5. Barrel temperatures were set at 190-200° C. resulting in melt temperatures not exceeding 250° C. depending on the composition and extruder rate and rpm of the screw. Upon exiting the extruder, the compositions were cooled and pelletized.

Comparative Compounding Method a) The first step involved coating the mineral filler with a fatty acid ester. Barium sulfate (Blanc Fixe® N) was coated with 4 wt-% of glyceryl monostearate. Coating was done by heating the barium sulfate at 60° C. before adding the glyceryl monostearate under mechanical stirring for 30 minutes at 60° C.

b) The second step involved the compounding of the polyacetal resin, the coated minerals and the thermal stabilizer. Polymeric compositions were prepared by compounding in a 40 mm Berstorf twin screw extruder. The polyacetal resin pellets were added to the rear (barrel 1) of the extruder and the coated minerals were side fed into Barrel 5. Barrel temperatures were set at 190-200° C. resulting in melt temperatures not exceeding 250° C. depending on the composition and extruder rate and rpm of the screw. Upon exiting the extruder, the compositions were cooled and pelletized.

Determination of Thermal Stability:

The thermal stability of the compositions was determined by heating pellets of the compositions for about 30 minutes at a temperature of 220° C. The formaldehyde evolved during the heating step was swept by a stream of nitrogen into a titration vessel containing a sodium sulfite solution where it reacted with the sodium sulfite to generate sodium hydroxide. The generated sodium hydroxide was continuously titrated with hydrochloric acid to maintain the original pH. The total volume of acid used was plotted as a function of time. The total volume of acid consumed at 30 minutes was proportional to the formaldehyde generated by the heated polyacetal composition and was a quantitative measure of thermal stability. The percent thermal stability (referred to as TEF-T) was calculated by the following formula:

$$TEF\text{-}T(\%) = (V_{30} \times N \times 3.003)/S \text{ where:}$$

$V_{30}$=the total volume in mL of acid consumed at 30 minutes,
N=the normality of the acid,
3.003=(30.03 (the molecular weight of formaldehyde)×100%)/(1000 mg/g), and
S=the sample weight in grams.

The results are shown in Table 1 under the heading of "TEF-T."

Mechanical Properties

Mechanical tensile properties, i.e. tensile modulus, stress at break, and strain at break were measured according to ISO 527-1/2. Measurements were done on injection molded ISO tensile bar R60 samples (melt temperature=210+/−5° C.; mold temperature=90-120° C. and a hold pressure of 100 MPa) with a thickness of the test specimen of 2 mm and a width of 4 mm according to ISO 527. The test specimens were measured dried as moulded (DAM).

Mechanical properties were measured for 10 test specimens made of the polyacetal composition manufactured according to the present invention (E1-E2) and manufactured according to the state of the art (C1-C2) and the results is the average of them. The results are shown in Table 1 under the headings of "tensile modulus", "stress at break" and "strain at break".

TABLE 1

|  | C0 | C1 | E1 | C2 | E2 |
|---|---|---|---|---|---|
| polyacetal copolymer | — | 73.5 | 73.5 | — | — |
| polyacetal homopolymer | 74.5 | — | — | 73.5 | 73.5 |
| thermal stabilizer | 0.5 | 0.5 | 0.5 | 0.5 | 0.5 |
| mineral filler | 25.0 | — | 25.0 | — | 25.0 |
| fatty acid ester | — | — | 1.0 | — | 1.0 |
| coated mineral filler | — | 26 | — | 26 | — |
| TEF-T/%* | NA | 0.048 | 0.043 | 0.247 | 0.130 |
| tensile modulus/GPa | NA | 3114 | 3114 | 3523 | 3585 |
| stress at break/MPa | NA | 45.8 | 45.2 | 52.8 | 53.6 |
| strain at break/% | NA | 39.3 | 46.6 | 34.2 | 36.4 |

*could not be measured due to the degradation of the polyacetal composition. Ingredient quantities are given in wt-% on the basis of the total weight of the polyacetal composition.

The comparative composition C0, i.e. a polyacetal composition comprising mineral filler without fatty acid ester or comprising mineral filler that was not pre-coated with a fatty acid ester, had so badly degraded in the twin screw extruder during compounding that, upon exiting the extruder, it was not possible to pelletize it. Thus, physical properties and thermal stability could not be measured for this composition since it was not possible to prepare test specimens.

Thermal resistance of polyacetal compositions was quantified with the percent thermal stability (TEF-T). As shown in Table 1, the polyacetal compositions made by the methods described herein (E1-E2), i.e. a method involving a single step wherein all ingredients are combined at once, exhibited a comparable (E1) or an improved (E2) thermal stability as shown by similar (E1) or lower (E2) values of TEF-T than the polyacetal compositions manufactured according to the state of the art (C1-C2), i.e. a method involving two steps, the first step being the coating of the mineral filler with the fatty acid ester and the second step being the combination of the coated mineral filler and the polyacetal resin.

With the aim of assessing the mechanical tensile properties, i.e. tensile modulus, stress at break, and strain were measured for the polyacetal compositions by the methods described herein (E1-E2) and made by conventional methods in the art (C1-C2); higher values of mechanical tensile properties mean better mechanical properties. Table 1 shows that the polyacetal compositions made by the methods described herein (E1-E2) exhibited comparable mechanical tensile properties as the polyacetal compositions made by conventional methods (C1-C2).

If compared with polyacetal compositions manufactured according to conventional methods, the polyacetal compositions made by the methods described herein show a comparable or improved thermal stability, comparable or improved mechanical properties and can be manufactured more efficiently and at lower cost due to removal of the pre-coating step.

What is claimed is:

1. A method for detecting conveyor system material in an ingestible product conveyed by a conveyor system comprising:
   a) transporting an ingestible product by a conveyor system comprising at least one conveyor system part made by mixing:
      i) from at or about 20 to at or about 84.5 weight percent of a polyacetal resin, based on the total weight of the polyacetal composition;
      ii) from at or about 15 to at or about 80 weight percent of at least one X-ray opaque mineral filler, based on the total weight of the polyacetal composition; and
      iii) from at or about 0.5 to at or about 6 weight percent of at least one component selected from the group consisting of fatty acid esters, fatty acid amides, and mixtures of these, the weight percent based on the weight of the at least one mineral filler,
   wherein the at least one X-ray opaque, mineral filler has not been previously coated;
   c) irradiating the ingestible product with X-Rays;
   d) detecting the presence of X-ray opaque mineral filler.

2. The method of claim 1, wherein the at least one component selected is one or more fatty acid esters.

3. The method of claim 1, wherein the at least one component selected comprises glyceryl monostearate.

4. The method of claim 1, wherein the at least one mineral filler is barium sulfate, lanthanide oxide, zinc oxide, or mixtures of these.

5. The method of claim 1, wherein the at least one mineral filler is barium sulfate.

6. The method of claim 1, wherein the polyacetal composition further comprises from at or about 0.005 to at or about 4 weight percent of one or more thermal stabilizers, based on the total weight of the polyacetal composition.

7. The method of claim 6, wherein the one or more thermal stabilizers are selected from polyacrylamides, ethylene vinyl alcohol copolymers and mixtures thereof.

8. The method of claim 1, wherein the at least one mineral filler is barium sulfate and wherein the polyacetal composition further comprises from at or about 0.005 to at or about 4 weight percent of one or more thermal stabilizers, based on the total weight of the polyacetal composition.

* * * * *